(12) United States Patent
de Souza et al.

(10) Patent No.: US 10,644,356 B2
(45) Date of Patent: May 5, 2020

(54) HIGH CHARGE RATE, LARGE CAPACITY, SOLID-STATE BATTERY

(71) Applicant: International Business Machines Corporation, Armonk, NY (US)

(72) Inventors: Joel P. de Souza, Putnam Valley, NY (US); Yun Seog Lee, White Plains, NY (US); Ning Li, White Plains, NY (US); Devendra K. Sadana, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/818,385

(22) Filed: Nov. 20, 2017

(65) Prior Publication Data

US 2018/0294529 A1 Oct. 11, 2018

Related U.S. Application Data

(63) Continuation of application No. 15/481,042, filed on Apr. 6, 2017.

(51) Int. Cl.
*H01M 10/0585* (2010.01)
*H01M 2/20* (2006.01)
(Continued)

(52) U.S. Cl.
CPC ........ *H01M 10/0585* (2013.01); *H01M 2/204* (2013.01); *H01M 2/266* (2013.01);
(Continued)

(58) Field of Classification Search
CPC ........ H01M 2/204; H01M 2/266; H01M 2/34; H01M 4/131; H01M 10/0525; H01M 10/0585; H01M 2220/30
See application file for complete search history.

(56) References Cited

U.S. PATENT DOCUMENTS

| | | |
|---|---|---|
| 3,687,745 A | 8/1972 | Chang et al. |
| 4,369,237 A | 1/1983 | Goebel |

(Continued)

FOREIGN PATENT DOCUMENTS

| | | |
|---|---|---|
| CN | 201927671 U | 8/2011 |
| CN | 103178302 A | 6/2013 |

(Continued)

OTHER PUBLICATIONS

Office Action dated Aug. 16, 2018 received in the parent U.S. Patent Application, namely U.S. Appl. No. 15/481,042.
(Continued)

*Primary Examiner* — Gary D Harris
(74) *Attorney, Agent, or Firm* — Scully, Scott, Murphy & Presser, P.C.; L. Jeffrey Kelly, Esq.

(57) ABSTRACT

Solid-state battery structures, particularly solid-state lithium-based battery structures, which are fast charging and have a high capacity are provided. Notably, fast charging, high capacity solid-state battery structures are provided that include a plurality of solid-state-thin-film batteries that are stacked one atop the other, or that include an array of interconnected solid-state thin-film batteries, or that contain a solid-state thin-film battery located on physically exposed surfaces of fin structures.

13 Claims, 7 Drawing Sheets

(51) Int. Cl.

| | | |
|---|---|---|
| *H01M 4/131* | (2010.01) | |
| *H01M 2/26* | (2006.01) | |
| *H01M 10/0525* | (2010.01) | |
| *H01M 2/34* | (2006.01) | |
| *H01M 6/40* | (2006.01) | |
| *H01M 10/052* | (2010.01) | |
| *H01M 10/04* | (2006.01) | |
| *H01M 10/0562* | (2010.01) | |

(52) U.S. Cl.
CPC .......... *H01M 2/34* (2013.01); *H01M 4/131* (2013.01); *H01M 6/40* (2013.01); *H01M 10/0436* (2013.01); *H01M 10/0463* (2013.01); *H01M 10/0472* (2013.01); *H01M 10/052* (2013.01); *H01M 10/0525* (2013.01); *H01M 10/0562* (2013.01); *H01M 2200/103* (2013.01); *H01M 2220/30* (2013.01)

(56) References Cited

U.S. PATENT DOCUMENTS

| | | | |
|---|---|---|---|
| 4,816,357 | A | 3/1989 | Hope et al. |
| 5,541,496 | A | 7/1996 | Simmonds |
| 5,939,217 | A | 8/1999 | Tamura et al. |
| 5,994,834 | A | 11/1999 | Alwan et al. |
| 6,094,292 | A | 7/2000 | Goldner et al. |
| 6,168,884 | B1 | 1/2001 | Neudecker et al. |
| 6,329,789 | B1 | 12/2001 | Gavrilov et al. |
| 6,495,283 | B1 * | 12/2002 | Yoon ............... H01M 6/18 29/623.5 |
| 6,555,945 | B1 | 4/2003 | Baughman et al. |
| 6,713,987 | B2 | 3/2004 | Krasnov et al. |
| 7,244,527 | B2 | 7/2007 | Klein |
| 7,261,979 | B2 | 8/2007 | Gozdz et al. |
| 7,303,994 | B2 | 12/2007 | Cooney, III et al. |
| 7,314,683 | B2 | 1/2008 | Choi et al. |
| 7,508,171 | B2 | 3/2009 | Carrier et al. |
| 7,583,058 | B2 | 9/2009 | Iijima et al. |
| 7,771,871 | B2 | 8/2010 | Zhou et al. |
| 7,959,769 | B2 | 6/2011 | Zhang et al. |
| 7,993,773 | B2 | 8/2011 | Snyder et al. |
| 8,236,452 | B2 | 8/2012 | Zhamu et al. |
| 8,383,265 | B2 | 2/2013 | Kang et al. |
| 8,475,963 | B2 | 7/2013 | Oukassi et al. |
| 8,636,876 | B2 | 1/2014 | Zhang et al. |
| 8,790,804 | B2 * | 7/2014 | Deligianni ......... H01M 2/204 337/401 |
| 8,974,960 | B2 | 3/2015 | Manthiram et al. |
| 8,999,571 | B2 | 4/2015 | Chiang et al. |
| 9,413,044 | B2 | 8/2016 | Iwamoto |
| 9,559,349 | B2 | 1/2017 | Braun et al. |
| 9,567,683 | B2 | 2/2017 | Lopatin et al. |
| 10,014,552 | B1 | 7/2018 | Shnitser et al. |
| 2001/0032666 | A1 | 10/2001 | Jenson et al. |
| 2002/0012825 | A1 | 1/2002 | Sasahara et al. |
| 2002/0071983 | A1 | 6/2002 | Rowen et al. |
| 2002/0092558 | A1 | 7/2002 | Kim et al. |
| 2003/0064257 | A1 | 4/2003 | Iwasaki et al. |
| 2003/0162094 | A1 | 8/2003 | Lee et al. |
| 2003/0170519 | A1 | 9/2003 | Mittelstadt et al. |
| 2004/0048157 | A1 | 3/2004 | Neudecker et al. |
| 2004/0058237 | A1 | 3/2004 | Higuchi et al. |
| 2004/0131779 | A1 | 7/2004 | Haubrich et al. |
| 2004/0131925 | A1 | 7/2004 | Jenson et al. |
| 2004/0166409 | A1 | 8/2004 | Takada et al. |
| 2004/0234847 | A1 | 11/2004 | Mino et al. |
| 2004/0258984 | A1 | 12/2004 | Ariel et al. |
| 2005/0064291 | A1 | 3/2005 | Sato et al. |
| 2005/0130078 | A1 | 6/2005 | Bedell et al. |
| 2005/0147877 | A1 | 7/2005 | Tarnowski et al. |
| 2005/0191547 | A1 | 9/2005 | Konishiike et al. |
| 2006/0110661 | A1 | 5/2006 | Lee et al. |
| 2006/0278580 | A1 | 12/2006 | Striemer et al. |
| 2007/0009802 | A1 | 1/2007 | Lee et al. |
| 2007/0134549 | A1 | 6/2007 | Nathan et al. |
| 2007/0190413 | A1 | 8/2007 | Lee et al. |
| 2008/0044732 | A1 | 2/2008 | Salot et al. |
| 2008/0050656 | A1 | 2/2008 | Eisenbeiser |
| 2008/0057397 | A1 * | 3/2008 | Skotheim ............ H01M 2/1673 429/212 |
| 2008/0213671 | A1 | 9/2008 | Kogetsu et al. |
| 2009/0246636 | A1 | 10/2009 | Chiang et al. |
| 2010/0119881 | A1 | 5/2010 | Patel et al. |
| 2010/0151318 | A1 | 6/2010 | Lopatin et al. |
| 2010/0285372 | A1 | 11/2010 | Lee et al. |
| 2010/0291444 | A1 | 11/2010 | Farmer et al. |
| 2010/0316913 | A1 | 12/2010 | Klaasen |
| 2011/0076542 | A1 | 3/2011 | Farmer |
| 2011/0095720 | A1 * | 4/2011 | Shacklette ........... H01M 4/525 320/101 |
| 2011/0097623 | A1 | 4/2011 | Marinis, Jr. et al. |
| 2011/0115425 | A1 | 5/2011 | Olsson |
| 2011/0143195 | A1 | 6/2011 | Ito et al. |
| 2011/0146064 | A1 | 6/2011 | Feaver et al. |
| 2011/0281160 | A1 | 11/2011 | Doi |
| 2011/0294015 | A1 | 12/2011 | Pirk et al. |
| 2012/0052401 | A1 | 3/2012 | Goodenough et al. |
| 2012/0164539 | A1 | 6/2012 | Zhamu et al. |
| 2012/0270114 | A1 | 10/2012 | Reynolds et al. |
| 2013/0049150 | A1 | 2/2013 | Hong et al. |
| 2013/0052489 | A1 | 2/2013 | Zhamu et al. |
| 2013/0059204 | A1 | 3/2013 | Holzapfel et al. |
| 2013/0071729 | A1 | 3/2013 | Klaasen |
| 2013/0089769 | A1 | 4/2013 | Proctor et al. |
| 2013/0095381 | A1 | 4/2013 | Oukassi et al. |
| 2013/0122347 | A1 | 5/2013 | Horikawa et al. |
| 2013/0130066 | A1 | 5/2013 | Pytlik et al. |
| 2013/0149593 | A1 | 6/2013 | Hayashi et al. |
| 2013/0162216 | A1 | 6/2013 | Zhamu et al. |
| 2013/0164459 | A1 | 6/2013 | Nieh et al. |
| 2013/0171502 | A1 | 7/2013 | Chen et al. |
| 2013/0190956 | A1 | 7/2013 | Zhamu et al. |
| 2013/0202945 | A1 | 8/2013 | Zhamu et al. |
| 2013/0224632 | A1 | 8/2013 | Roumi |
| 2013/0257352 | A1 | 10/2013 | Gofman et al. |
| 2013/0260183 | A1 | 10/2013 | Ellis-Monaghan et al. |
| 2013/0266861 | A1 | 10/2013 | Lu et al. |
| 2013/0337305 | A1 | 12/2013 | Nagai et al. |
| 2014/0011013 | A1 | 1/2014 | Jin et al. |
| 2014/0099538 | A1 | 4/2014 | Johnson et al. |
| 2014/0212735 | A1 | 7/2014 | Li et al. |
| 2014/0295268 | A1 | 10/2014 | Wang et al. |
| 2015/0084157 | A1 * | 3/2015 | Tegen ............... H01M 10/0436 257/528 |
| 2015/0102530 | A1 | 4/2015 | Wallace et al. |
| 2015/0162617 | A1 | 6/2015 | Liu et al. |
| 2015/0280198 | A1 * | 10/2015 | Weis ............... H01M 10/0562 429/147 |
| 2015/0325862 | A1 | 11/2015 | Song et al. |
| 2016/0013462 | A1 | 1/2016 | Cui et al. |
| 2016/0181615 | A1 | 6/2016 | Van Duren et al. |
| 2016/0211547 | A1 | 7/2016 | Hwang et al. |
| 2016/0329541 | A1 | 11/2016 | Adams et al. |
| 2016/0351973 | A1 | 12/2016 | Albano et al. |
| 2017/0062829 | A1 | 3/2017 | Ryu et al. |
| 2017/0077486 | A1 | 3/2017 | Ishii |
| 2017/0162854 | A1 | 6/2017 | Sugiura |
| 2017/0214062 | A1 | 7/2017 | Song et al. |
| 2017/0237124 | A1 | 8/2017 | Song et al. |
| 2018/0123181 | A1 | 5/2018 | Son et al. |
| 2019/0088991 | A1 | 3/2019 | Hegde et al. |

FOREIGN PATENT DOCUMENTS

| | | |
|---|---|---|
| DE | 102011085863 A1 | 5/2013 |
| JP | 11162519 A | 6/1999 |
| JP | 2007103130 A | 4/2007 |
| JP | 4269917 B2 | 3/2009 |
| JP | 2013229315 A | 11/2013 |
| JP | 2014143008 A | 8/2014 |
| JP | 2015-26555 A | 2/2015 |
| KR | 1020070077231 A | 7/2007 |

(56) References Cited

FOREIGN PATENT DOCUMENTS

| KR | 100855081 B1 | 8/2008 | | |
|---|---|---|---|---|
| KR | 1020130116828 A | 10/2013 | | |
| KR | 101468542 B1 | 12/2014 | | |
| WO | 2016033379 A1 | 3/2016 | | |
| WO | WO-2017105234 A1 | * | 6/2017 | .............. H01M 4/04 |

OTHER PUBLICATIONS

"Heavy Duty—Built in Battery Protection System", accessed on Feb. 24, 2017, 4 pages, http://www.lithiumion-batteries.com/LithiumIonBatteryProtectionSystem.php.

"BU-304b: Making Lithium-ion Safe", accessed on Feb. 24, 2017, 1 page, http://batteryuniversity.com/learn/article/bu_304b_making_lithium_ion_safe.

"Smart Battery® 3.2V 5Ah LiFePO4 Battery Cell Cell Safety Features", accessed on Sep. 27, 2013, 5 pages, www.smartbattery.com.

Berdichevsky, G., et al., "The Tesla Roadster Battery System", Tesla Motors, Aug. 16, 2006 (updated Dec. 19, 2007), 5 pages.

Das, S. et al., "Impact of Electrode Surface/Volume Ratio on Li-ion Battery Performance", 2014 COMSOL Conference in Boston, Oct. 2014, 6 pages.

Carmo, J. P., et al., "Integrated thin-film rechargeable battery in a thermoelectric scavenging microsystem", POWERENG, Mar. 18-20, 2009, p. 359-362, Lisbon, Portugal.

Boyle, R., "Tiny Battery Embedded in a Nanowire Is the Smallest Battery Yet", Popular Science, Jul. 29, 2011, 2 pages.

Chung, J., et al., "Pulsed laser deposited LiNi0.5Mn0.5O2 thin films on the Pt(200)/TiO2/SiO2/Si substrates for lithium-ion battery application", IEEE, Nanotechnology Materials and Devices Conference, Date of Conference: Oct. 22-25, 2006, NMDC, pp. 640-641.

Matsumoto, H., et al., "Fast cycling of Li/LiCoO2 cell with low-viscosity ionic liquids based on bis(fluorosulfonyl)imide [FSI]−", Journal of Power Sources 160, Available online Mar. 22, 2006, pp. 1308-1313.

Jo, M., et al., "Effect of LiCoO2 Cathode Nanoparticle Size on High Rate Performance for Li-Ion Batteries", Journal of the Electrochemical Society, Published Apr. 6, 2009, pp. A430-A434, 156, 6.

Kang, B., et al., "Battery materials for ultrafast charging and discharging", Nature, Mar. 12, 2009, pp. 190-193, vol. 458.

Liu, Y. et al., "An Artificial Solid Electrolyte Interphase with High Li-Ion Conductivity, Mechanical Strength, and Flexibility for Stable Lithium", Advanced Materials, Mar. 2017, 8 pages.

Borghino, D., "New Li-ion anode achieves 70 percent charge in just two minutes", New Atlas, http://newatlas.com/quick-charge-li-ion-battery/34347/, Oct. 21, 2014, 4 pages.

Deleon, S., "Ultra Fast Charging Lithium Battery Market, power point slide presentation", Energy Ltd., http://www.sdle.co.il/AllSites/810/Assets/23%20-%20ul, Oct. 2012, 18 pages.

Tang, Y., et al., "Mechanical Force-Driven Growth of Elongated Bending TiO2-based Nanotubular Materials for Ultrafast Rechargeable Lithium Ion Batteries", Advanced Materials, Sep. 17, 2014, pp. 6111-6118, vol. 26, Issue 35.

Zeng, et al., "In situ TEM study of the Li—Au reaction in an electrochemical liquid cell", Faraday Discuss., Jul. 2014, pp. 95-107, 176.

Yan, et al., "Selective deposition and stable encapsulation of lithium through heterogeneous seeded growth", Nature Energy, Feb. 22, 2016, pp. 1-9, Article No. 16010.

List of IBM Patents or Patent Applications Treated as Related dated Nov. 20, 2017, 2 pages.

Office Action dated Oct. 5, 2018 received in U.S. Appl. No. 15/818,405.

Office Action dated Sep. 4, 2018 received in U.S. Appl. No. 15/474,434.

Office Action dated Jan. 11, 2019 received in U.S. Appl. No. 15/474,640.

Office Action dated Nov. 2, 2018 received in a related application, namely U.S. Appl. No. 15/474,668.

Office Action dated Feb. 8, 2019 received in U.S. Appl. No. 15/481,042.

Office Action dated Feb. 28, 2019 received in U.S. Appl. No. 15/818,405.

Office Action dated Jun. 5, 2019 received in U.S. Appl. No. 15/815,842.

Office Action dated Jun. 5, 2019 received in U.S. Appl. No. 15/818,405.

Office Action dated Jun. 11, 2019 received in U.S. Appl. No. 15/481,042.

Office Action dated Mar. 20, 2019 received in U.S. Appl. No. 15/474,570.

Office Action dated Mar. 21, 2019 received in the parent U.S. Patent Application, namely U.S. Appl. No. 15/474,434.

Advisory Action dated Apr. 16, 2019 received in the parent application, namely, U.S. Appl. No. 15/481,042.

Office Action dated Apr. 18, 2019 received in U.S. Appl. No. 15/474,668.

Office Action dated May 16, 2019 received in U.S. Appl. No. 15/818,350.

Office Action dated May 16, 2019 received in U.S. Appl. No. 15/818,286.

Banerjee, N., et al., "Fabrication of piezodriven, free-standing, all-oxide heteroepitaxial cantilevers on silicon", APL Mater., Sep. 2014, pp. 096103-1 to 096103-7, 2.

Office Action dated May 31, 2019 received in U.S. Appl. No. 15/820,609.

List of IBM Patents or Patent Applications Treated as Related, dated Jun. 21, 2019, 2 pages.

Office Action dated Jun. 27, 2019 received in U.S. Appl. No. 15/474,640.

Office Action dated Jul. 8, 2019 received in U.S. Appl. No. 15/474,570.

Office Action dated Aug. 22, 2019 received in U.S. Appl. No. 15/822,301.

Notice of Allowance dated Oct. 22, 2019 received in U.S. Appl. No. 15/474,570.

Office Action dated Nov. 13, 2019 received in U.S. Appl. No. 15/474,668.

Office Action dated Nov. 14, 2019 received in U.S. Appl. No. 15/820,609.

Office Action dated Dec. 12, 2019 received in U.S. Appl. No. 15/815,842.

Office Action dated Mar. 19, 2020 received in U.S. Appl. No. 15/474,640.

* cited by examiner

HIGH CHARGE RATE, LARGE CAPACITY, SOLID-STATE BATTERY

BACKGROUND

The present application relates to solid-state thin-film battery technology. More particularly, the present application relates to fast charging, high capacity, solid-state battery structures, and methods of forming the same.

In recent years, there has been an increased demand for portable electronic devices such as, for example, computers, mobile phones, tracking systems, scanners, medical devices, smart watches, and fitness devices. One drawback with portable electronic devices is the need to include a power supply within the device itself. Typically, a battery is used as the power supply of such portable electronic devices. Batteries must have sufficient capacity to power the portable electronic device for at least the length that the device is being used. Sufficient battery capacity can result in a power supply that is quite heavy and/or large compared to the rest of the portable electronic device. As such, smaller sized and lighter weight power supplies with sufficient energy storage are desired. Such power supplies can be implemented in smaller and lighter weight portable electronic devices.

Another drawback of conventional batteries is that some of the batteries contain potentially flammable and toxic materials that may leak and may be subject to governmental regulations. As such, it is desired to provide an electrical power supply that is safe, solid-state and rechargeable over many charge/discharge life cycles.

One type of an energy-storage device that is small and light weight, contains non-toxic materials and that can be recharged over many charge/discharge cycles is a solid-state, lithium-based battery. Lithium-based batteries are rechargeable batteries that include two electrodes implementing lithium.

The charging speed of solid-state, lithium-based batteries is often limited and is typically below 3 C, wherein C is the total battery capacity per hour. Some factors that may contribute to the limited charging speed of solid-state, lithium-based batteries is the presence of a high resistive cathode material such as, for example, $LiCoO_2$, within the battery cell material stack, the high interfacial energy that can exist between metallic lithium and the top electrode, and metallic-lithium dendrite formation under large voltage bias.

There is thus a need for providing solid-state battery structures, such as lithium-based battery structures, that are fast charging, yet have a high capacity.

SUMMARY

The present application provides solid-state battery structures, particularly solid-state lithium-based battery structures, which are fast charging and have a high capacity. Notably, fast charging, high capacity solid-state battery structures are provided that include a plurality of solid-state thin-film batteries that are stacked one atop the other, or that include an array of interconnected solid-state thin-film batteries, or that contain a solid-state thin-film battery located on physically exposed surfaces of fin (i.e., pillar) structures.

The term "thin-film battery" is used throughout the present application to denote a battery whose thickness is 100 μm or less. Such thin-film batteries are small and light weight, and thus can be implemented in many different types of portable electronic devices. The term "solid-state" denotes a battery in which all the battery components, including the electrolyte, are solid materials. The term "fast charging" denotes a battery that has a charge rate of 3 C or greater, wherein C is the total battery capacity per hour. The "term "high capacity" denotes a battery having a capacity of 1 Amps hour or greater.

In one aspect of the present application, a solid-state battery structure is provided that is fast charging and has a high capacity. In one embodiment, the solid-state battery structure includes a plurality of solid-state thin-film battery sub-sheets vertically stacked one atop the other. A plurality of fuse elements is located in proximity to the plurality of solid-state thin-film battery sub-sheets. Each solid-state thin-film battery sub-sheet of the plurality of solid-state thin-film battery sub-sheets is connected to one fuse element, and the fuse elements of the plurality of fuse elements are configured to be in parallel with one another.

In another embodiment, the solid-state battery structure includes an array of solid-state thin-film batteries located on a surface of a substrate, each solid-state thin-film battery of the array of solid-state thin-film batteries comprises a bottom electrode, a battery cell material stack and a top electrode. A fuse element is in proximity to each solid-state thin-film battery of the plurality of solid-state thin-film batteries. Each fuse element of the plurality of fuse elements has a first end connected to the bottom electrode of one of the solid-state thin-film batteries and a second end connected to a first bus bar. The first bus bars are located on the substrate. At least one second bus bar is located above, and spaced apart from, each first bus bar, wherein the at least one second bus bar contacts a surface of the top electrode of each solid-state thin-film battery.

In some embodiments, additional arrays of solid-state thin-film batteries can be stacked one atop the other. In one example, a solid-state battery structure is provided that includes a first battery level comprising an array of solid-state thin-film batteries located on a surface of a substrate and a fuse element in proximity to each solid-state thin-film battery of the plurality of solid-state thin-film batteries in the first battery level, wherein each fuse element in the first battery level has a first end connected to a bottom electrode of one of the solid-state thin-film batteries in the first battery level and a second end connected to a first bus bar present in the first battery level, wherein the first bus bars present in the first battery level are located on the substrate. At least one second bus bar is located above, and spaced apart from, each first bus bar that is present in the first battery level. The at least one second bus bar contacts a surface of a top electrode of each solid-state thin-film battery in the first battery level. A second battery level comprising an array of solid-state thin-film batteries is located above the at least one second bus bar.

In yet another embodiment, the solid-state battery structure includes a plurality of substrate layers and dielectric material layers stacked one atop the other, wherein each dielectric material layer includes a solid-state thin-film battery located therein, wherein each solid-state thin-film battery comprises at least a bottom electrode, a cathode, a solid-state electrolyte, and a top electrode. A first via-filled contact structure interconnects each bottom electrode together, and a second via-filled contact structure interconnects each top electrode together.

In an even further embodiment, the solid-state battery structure includes at least one fin structure extending upwards from a base substrate. A solid-state thin-film battery structure is located on physically exposed surfaces of the at least one fin structure and on physically exposed surfaces of the base substrate.

In another aspect of the present application, a method of forming a solid-state battery structure that is fast charging and has a high capacity is provided. In one embodiment, the method includes providing a battery sheet containing a solid-state thin-film battery structure on a substrate. Next, the battery sheet is diced into individual battery sub-sheets, and thereafter, the individual battery sub-sheets are stacked one atop the other. A fuse element is then provided to each battery sub-sheet, wherein the fuse elements of the plurality of fuse elements are configured to be in parallel with one another.

In another embodiment, the method includes providing an array of solid-state thin-film batteries on a surface of a substrate, wherein each solid-state thin-film battery of the array of solid-state thin-film batteries comprises a bottom electrode, a battery cell material stack and a top electrode. Next, a fuse element is formed in proximity to each solid-state thin-film battery of the plurality of solid-state thin-film batteries. Each fuse element has a first end connected to the bottom electrode of one of the solid-state thin-film batteries and a second end connected to a first bus bar. The first bus bars are located on the substrate. At least one second bus bar is formed above, and spaced apart from each first bus bar, wherein the at least one second bus bar contacts a surface of the top electrode of each solid-state thin-film battery. In some embodiments, additional arrays of solid-stage thin-film batteries can be formed atop the array described above.

In yet a further embodiment, the method includes forming a plurality of substrate layers and dielectric material layers stacked one atop the other, wherein each dielectric material layer includes a solid-state thin-film battery located therein, wherein each solid-state thin-film battery comprises at least a bottom electrode, a cathode, a solid-state electrolyte, and a top electrode. A first via-filled contact structure and a second via-filled contact structure are formed. The first via-filled contact structure interconnects each bottom electrode together, while the second via-filled contact structure interconnects each top electrode together.

In an even further embodiment, the method includes providing at least one fin structure extending upwards from a base substrate. Next, a solid-state thin-film battery structure is formed on physically exposed surfaces of the at least one fin structure and on physically exposed surfaces of the base substrate.

DETAILED DESCRIPTION

Figure 1:
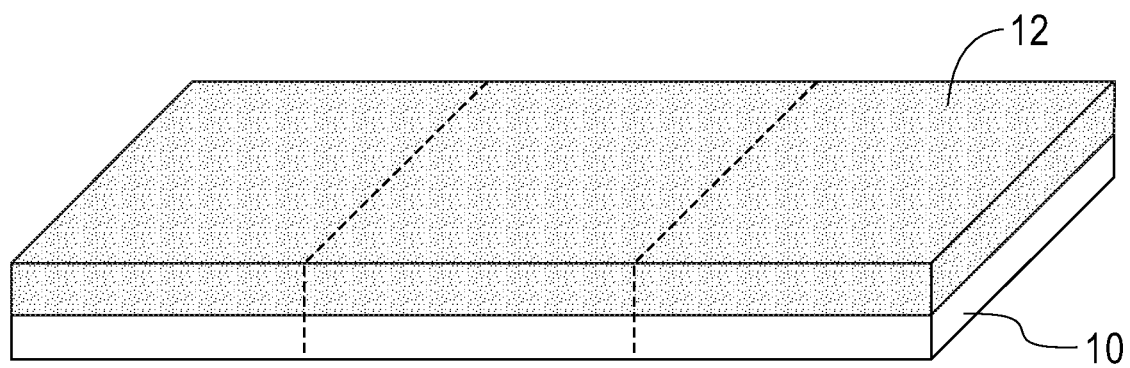
FIG. 1 is a pictorial represents of an exemplary solid-state thin-film battery sheet of a battery structure located on a substrate that can be employed in the present application.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

It will be understood that when an element as a layer, region or substrate is referred to as being "on" or "over" another element, it can be directly on the other element or intervening elements may also be present. In contrast, when an element is referred to as being "directly on" or "directly over" another element, there are no intervening elements present. It will also be understood that when an element is referred to as being "beneath" or "under" another element, it can be directly beneath or under the other element, or intervening elements may be present. In contrast, when an element is referred to as being "directly beneath" or "directly under" another element, there are no intervening elements present.

Referring first to FIG. 1, there is illustrated an exemplary solid-state thin-film battery sheet of a solid-state thin-film battery structure 12 located on a substrate 10 that can be employed in the present application. As is shown, the solid-state thin-film battery structure 12 is continuously (without any breaks or gaps) present on the entirety of the substrate 10. In FIG. 1, the dotted lines represent locations in which subsequent cutting of the exemplary solid-state thin-film battery sheet (10, 12) will be performed.

The substrate 10 that can be employed in the present application includes any conventional material that is used as a substrate for a solid-state thin-film battery. In one embodiment, the substrate 10 may include one or more semiconductor materials. The term "semiconductor material" is used throughout the present application to denote a material having semiconducting properties.

Examples of semiconductor materials that may be employed as substrate 10 include silicon (Si), germanium (Ge), silicon germanium alloys (SiGe), silicon carbide (SiC), silicon germanium carbide (SiGeC), III-V compound semiconductors or II-VI compound semiconductors. III-V compound semiconductors are materials that include at least one element from Group III of the Periodic Table of Elements and at least one element from Group V of the Periodic Table of Elements. II-VI compound semiconductors are materials that include at least one element from Group II of the Periodic Table of Elements and at least one element from Group VI of the Periodic Table of Elements.

In one embodiment, the semiconductor material that may provide substrate 10 is a bulk semiconductor substrate. By "bulk" it is meant that the substrate 10 is entirely composed of at least one semiconductor material, as defined above. In one example, the substrate 10 may be entirely composed of silicon. In some embodiments, the bulk semiconductor substrate may include a multilayered semiconductor material stack including at least two different semiconductor materials, as defined above. In one example, the multilayered semiconductor material stack may comprise, in any order, a stack of Si and a silicon germanium alloy.

In another embodiment, substrate 10 is composed of a topmost semiconductor material layer of a semiconductor-on-insulator (SOI) substrate. The SOI substrate would also include a handle substrate (not shown) including one of the above mentioned semiconductor materials, and an insulator layer (not shown) such as a buried oxide below the topmost semiconductor material layer.

In any of the embodiments mentioned above, the semiconductor material that may provide the substrate 10 may be a single crystalline semiconductor material. The semiconductor material that may provide the substrate 10 may have any of the well known crystal orientations. For example, the crystal orientation of the semiconductor material that may provide substrate 10 may be {100}, {110}, or {111}. Other crystallographic orientations besides those specifically mentioned can also be used in the present application.

In yet another embodiment, the substrate 10 is a dielectric material such as, for example, doped or non-doped silicate glass, silicon dioxide, or silicon nitride. In yet a further embodiment, the substrate 10 is composed of a polymer or flexible substrate material such as, for example, a polyimide, a polyether ketone (PEEK) or a transparent conductive polyester. In yet an even further embodiment, the substrate 10 may be composed of a multilayered stack of at least two of the above mentioned substrate materials, e.g., a stack of silicon and silicon dioxide.

The substrate 10 that can be used in the present application can have a thickness from 10 μm to 5 mm. Other thicknesses that are lesser than, or greater than, the aforementioned thickness values may also be used for substrate 10.

In some embodiments, the substrate 10 may have a non-textured (flat or planar) surface. The term "non-textured surface" denotes a surface that is smooth and has a surface roughness on the order of less than 100 nm root mean square as measured by profilometry. In yet another embodiment, the substrate 10 may have a textured surface. In such an embodiment, the surface roughness of the textured substrate can be in a range from 100 nm root mean square to 100 μm root mean square as also measured by profilometry. Texturing can be performed by forming a plurality of etching masks (e.g., metal, insulator, or polymer) on the surface of a non-textured substrate, etching the non-textured substrate utilizing the plurality of masks as an etch mask, and removing the etch masks from the non-textured surface of the substrate. In some embodiments, the textured surface of the substrate is composed of a plurality of pyramids. In yet another embodiment, the textured surface of the substrate is composed of a plurality of cones. In some embodiments, a plurality of metallic masks are used, which may be formed by depositing a layer of a metallic material and then performing an anneal. During the anneal, the layer of metallic material melts and balls-ups such that de-wetting of the surface of the substrate occurs. Details concerning the use of metallic masks in texturing a surface of a substrate can be found in co-pending and co-assigned U.S. patent application Ser. No. 15/474,434, filed on Mar. 30, 2017, the entire content of which is incorporated herein by reference.

The solid-state thin-film battery structure 12 includes solid-state thin-film battery materials which can be formed one atop the other on substrate 10 utilizing conventional deposition processes well known to those skilled in the art. Notably, the solid-state thin-film battery structure 12 comprises a bottom electrode, a cathode layer, a solid-state electrolyte layer and a top electrode. In some embodiments, the battery structure 12 may further include an anode region located between the solid-state electrolyte layer and the top electrode. The anode region may or may not be continuously present between the solid-state electrolyte layer and the top electrode. The anode region may be a deposited anode material, or it may be generated during a charging/recharging process. In a further embodiment, the solid-state thin-film battery structure 12 may even further include a liner located between the solid-state electrolyte layer and the anode region. Collectively, the material layers of the solid-state thin-film battery structure 12 located between the bottom electrode and the top electrode define a battery cell material stack.

Figure 2:
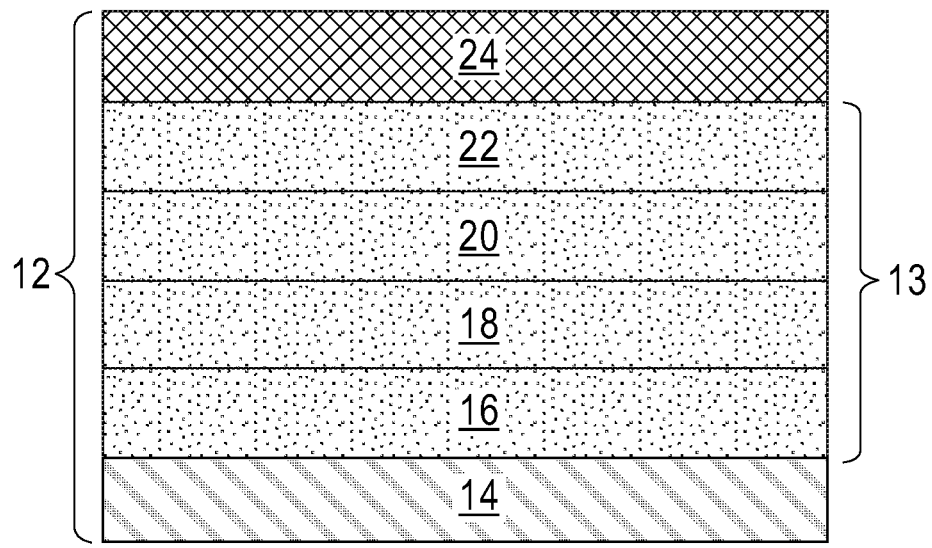
FIG. 2 is a cross view of an exemplary solid-state thin-film battery structure that can be used in the solid-state thin-film battery sheet of FIG. 1.

An exemplary solid-state thin-film battery structure 12 that can be employed is shown in FIG. 2. In one embodiment, the solid-state thin-film battery structure 12 shown in FIG. 2 is a solid-state thin-film lithium-based battery. Although a solid-state thin-film lithium-based battery is exemplified herein as the solid-state thin-film battery structure 12, other types of solid-state thin-film battery structures can be employed in the present application. Although FIG. 2 discloses the anode region 22 being located above the cathode layer 16, one skilled in the art would appreciate that the anode region 22 may be located beneath the cathode layer 16 by flipping the orientation of the solid-state thin-film battery structure shown in FIG. 2.

The solid-state thin-film battery structure 12 shown in FIG. 2 includes a bottom electrode 14, a cathode layer 16, a solid-state electrolyte layer 18, an optional liner 20, an anode region 22 and a top electrode 24. As stated above, the anode region 22 may be a deposited anode material, or it may be generated during a charging/recharging process. Collectively, the cathode layer 16, the solid-state electrolyte layer 18, the optional liner 20, and the anode region 22 may be referred to as a battery cell material stack 13.

The bottom electrode 14 of the solid-state thin-film battery structure 12 illustrated in FIG. 2 may include any metallic electrode material such as, for example, titanium (Ti), platinum (Pt), nickel (Ni), aluminum (Al) or titanium nitride (TiN). In one example, the bottom electrode 14 includes a stack of, from bottom to top, titanium (Ti), platinum (Pt) and titanium (Ti). The bottom electrode 14 may be formed utilizing a deposition process including, for example, chemical vapor deposition (CVD), plasma enhanced chemical vapor deposition (PECVD), evaporation, sputtering, or plating. The bottom electrode 14 may have a thickness from 10 nm to 500 nm. Other thicknesses that are lesser than, or greater than, the aforementioned thickness values may also be used for the bottom electrode 14.

The cathode layer 16 of the solid-state thin-film battery structure 12 illustrated in FIG. 2 may include a lithiated material such as, for example, a lithium-based mixed oxide. Hence, the cathode layer 16 illustrated in FIG. 2 may be referred to as a lithiated cathode material layer. Examples of lithium-based mixed oxides that may be employed as the cathode layer 16 include, but are not limited to, lithium cobalt oxide ($LiCoO_2$), lithium nickel oxide ($LiNiO_2$), lithium manganese oxide ($LiMn_2O_4$), lithium vanadium pentoxide ($LiV_2O_5$) or lithium iron phosphate ($LiFePO_4$). The cathode layer 16 illustrated in FIG. 2 may have a thickness from 10 nm to 20 µm. Other thicknesses that are lesser than, or greater than, the aforementioned thickness values may also be used for cathode layer 16 of the solid-state thin-film battery structure 12.

The cathode layer 16 of the solid-state thin-film battery structure 12 illustrated in FIG. 2 may be formed utilizing a deposition process such as, sputtering or plating. In one embodiment, the cathode layer 16 is formed by sputtering utilizing any conventional precursor source material or combination of precursor source materials. In one example, a lithium precursor source material and a cobalt precursor source material are employed in forming a lithium cobalt mixed oxide. Sputtering may be performed in an admixture of an inert gas and oxygen. In such an embodiment, the oxygen content of the inert gas/oxygen admixture can be from 0.1 atomic percent to 70 atomic percent, the remainder of the admixture includes the inert gas. Examples of inert gases that may be used include argon, helium, neon, nitrogen or any combination thereof.

The solid-state electrolyte layer 18 of the solid-state thin-film battery structure 12 illustrated in FIG. 2 includes a material that enables the conduction of lithium ions; the solid-state electrolyte layer 18 may be referred to as a lithium-based solid-state electrolyte layer. Such materials may be electrically insulating or ionic conducting. Examples of materials that can be employed as the solid-state electrolyte layer 18 include, but are not limited to, lithium phosphorus oxynitride (LiPON) or lithium phosphosilicate oxynitride (LiSiPON).

The solid-state electrolyte layer 18 may be formed utilizing a deposition process such as, sputtering or plating. In one embodiment, the solid-state electrolyte layer 18 of the lithium-based battery stack is formed by sputtering utilizing any conventional precursor source material. Sputtering may be performed in the presence of at least a nitrogen-containing ambient. Examples of nitrogen-containing ambients that can be employed include, but are not limited to, $N_2$, $NH_3$, $NH_4$, NO, or $NH_x$ wherein x is between 0 and 1. Mixtures of the aforementioned nitrogen-containing ambients can also be employed. In some embodiments, the nitrogen-containing ambient is used neat, i.e., non-diluted. In other embodiments, the nitrogen-containing ambient can be diluted with an inert gas such as, for example, helium (He), neon (Ne), argon (Ar) and mixtures thereof. The content of nitrogen ($N_2$) within the nitrogen-containing ambient employed is typically from 10% to 100%, with a nitrogen content within the ambient from 50% to 100% being more typical.

The solid-state electrolyte layer 18 of the battery structure 12 illustrated in FIG. 2 may have a thickness from 10 nm to 10 µm. Other thicknesses that are lesser than, or greater than, the aforementioned thickness values may also be used for the solid-state electrolyte layer 18.

The liner 20 that may be present in the solid-state thin-film battery structure 12 illustrated in FIG. 2 is a continuous layer that covers the entirety of the solid-state electrolyte layer 18; in some embodiments the liner 20 is omitted. In one embodiment, the liner is a lithium nucleation enhancement liner. In such an embodiment, the lithium nucleation enhancement liner includes a material that can facilitate the subsequent nucleation of lithium upon performing a charging/recharging process. In one embodiment, lithium nucleation enhancement liner that can be used as liner 20 is composed of gold (Au), silver (Ag), zinc (Zn), magnesium (Mg), tantalum (Ta), tungsten (W), molybdenum (Mo), a titanium-zirconium-molybdenum alloy (TZM), or silicon (Si). Detailed description of lithium nucleation enhancement liners can be found in co-pending and co-assigned U.S. patent application Ser. No. 15/474,668, filed Mar. 30, 2017, the entire content of which is incorporated herein by reference. In another embodiment, liner 20 is a barrier material such as, for example, LiF.

The liner 20 can be formed utilizing a deposition process. Examples of deposition processes than can be used in forming the liner 24 include chemical vapor deposition (CVD), plasma enhanced chemical vapor deposition (PECVD), evaporation, sputtering or plating. The liner 20 typically has a thickness that is greater than 1 nm. In one embodiment and when employed, the liner 20 has a thickness from 2 nm to 20 nm.

The anode region 22 of the solid-state thin-film battery structure 12 illustrated in FIG. 2 includes any material that is a lithium ion generator or lithium intercalation active material. Examples of materials that may be used as anode region 22 include, but are not limited to, lithium metal, a lithium-base alloy such as, for example, $Li_xSi$, or a lithium-based mixed oxide such as, for example, lithium titanium oxide ($Li_2TiO_3$). The anode region 22 may be a continuous layer or it may be composed of a plurality of non-continuous regions.

In some embodiments, the anode region 22 is formed prior to performing a charging/recharging process. In such an embodiment, the anode region 22 can be formed utilizing a deposition processes such as, for example, chemical vapor deposition (CVD), plasma enhanced chemical vapor deposition (PECVD), evaporation, sputtering or plating. In other embodiments, the anode region 22 is a lithium accumulation region that is formed during a charging/recharging process.

The top electrode 24 of the solid-state thin-film battery structure 12 illustrated in FIG. 2 may include any metallic electrode material such as, for example, titanium (Ti), platinum (Pt), nickel (Ni), copper (Cu) or titanium nitride (TiN). In one example, the top electrode 24 includes a stack of, from bottom to top, nickel (Ni) and copper (Cu). In one embodiment, the metallic electrode material that provides the top electrode 24 may be the same as the metallic electrode material that provides the bottom electrode 14. In another embodiment, the metallic electrode material that provides the top electrode 24 may be different from the metallic electrode material that provides the bottom electrode 14. The top electrode 24 may be formed utilizing one of the deposition processes mentioned above for forming the bottom electrode 14. The top electrode 24 may have a thickness within the range mentioned above for the bottom electrode 14. In the present application, top electrode 24 may be referred to as an anode-side electrode, while bottom electrode 12 may be referred to as a cathode-side electrode.

Figure 3:
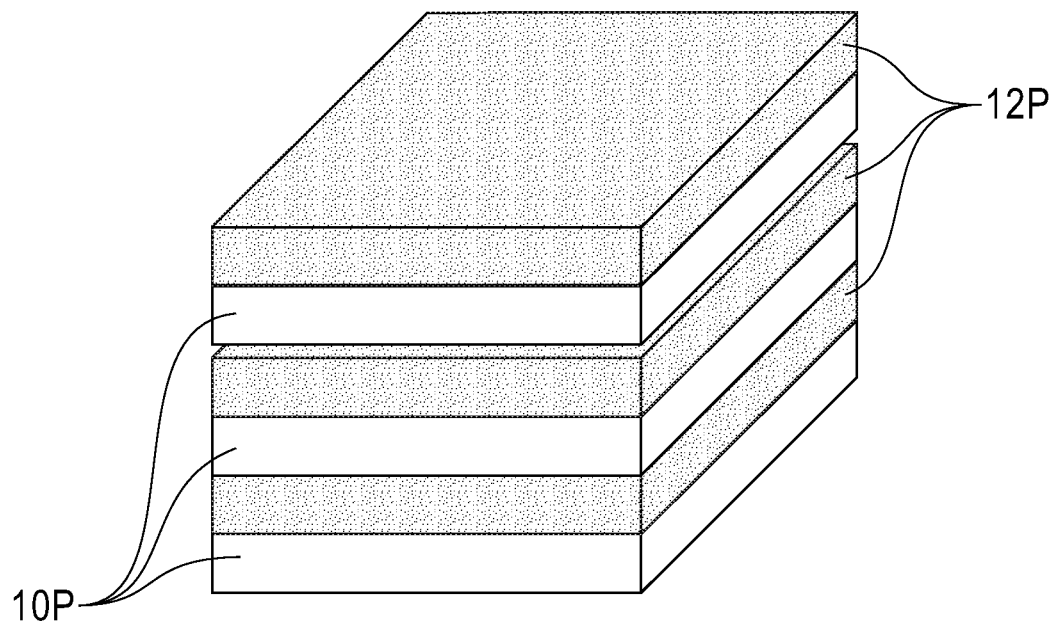
FIG. 3 is a pictorial representation of the exemplary solid-state thin-film battery sheet of FIG. 1 after cutting the battery sheet into individual solid-state thin-film battery sub-sheets and thereafter stacking the individual solid-state thin-film battery sub-sheets one atop the other.

Referring now to FIG. 3, there is illustrated the exemplary solid-state thin-film battery sheet of FIG. 1 after cutting the battery sheet (10, 12) into individual solid-state thin-film battery sub-sheets (10P, 12P) and thereafter stacking the individual solid-state thin-film battery sub-sheets (10P, 12P) one atop the other to provide a vertically stacked solid-state battery structure. In the present application, element 10P denotes a substrate material portion, while element 12P denotes a solid-state thin-film battery structure portion. Each solid-state thin-film battery structure portion 12P includes a remaining portion of the bottom electrode 12, a remaining portion of the battery cell material stack 13, and a remaining portion of the top electrode 24. In the illustrated embodiment, cutting is performed along the dotted lines shown in FIG. 1.

The number of individual solid-state thin-film battery sub-sheets (10P, 12P) that can be present in the vertically stacked solid-state battery structure may vary and is not limited to 3 solid-state thin-film battery sub-sheets (10P, 12P) as shown in FIG. 3. For example, 10, 20, 30, 40, etc. battery sub-sheets (10P, 12P) may be stacked one atop the other.

The size (i.e., length and width) of each individual solid-state thin-film battery sub-sheet (10P, 12P) may be determined by the defect density of the battery sheet. In one example, the length of each individual solid-state thin-film battery sub-sheet (10P, 12P) may be from 100 nm 1 meter, while the width may be from 100 nm to 1 meter. Other lengths and widths may also be used in the present application for each solid-state thin-film battery sub-sheet (10P, 12P). Upon stacking, which may be performed by hand or by mechanical means such as a robot arm, and as is shown, the sidewall surfaces of each individual solid-state thin-film battery sub-sheet (10P, 12P) are vertically aligned to each other.

Cutting may be performed utilizing techniques that are well known to those skilled in the art. In one example, the cutting process may include dicing. In another example, the cutting process may include sawing.

Figure 4:
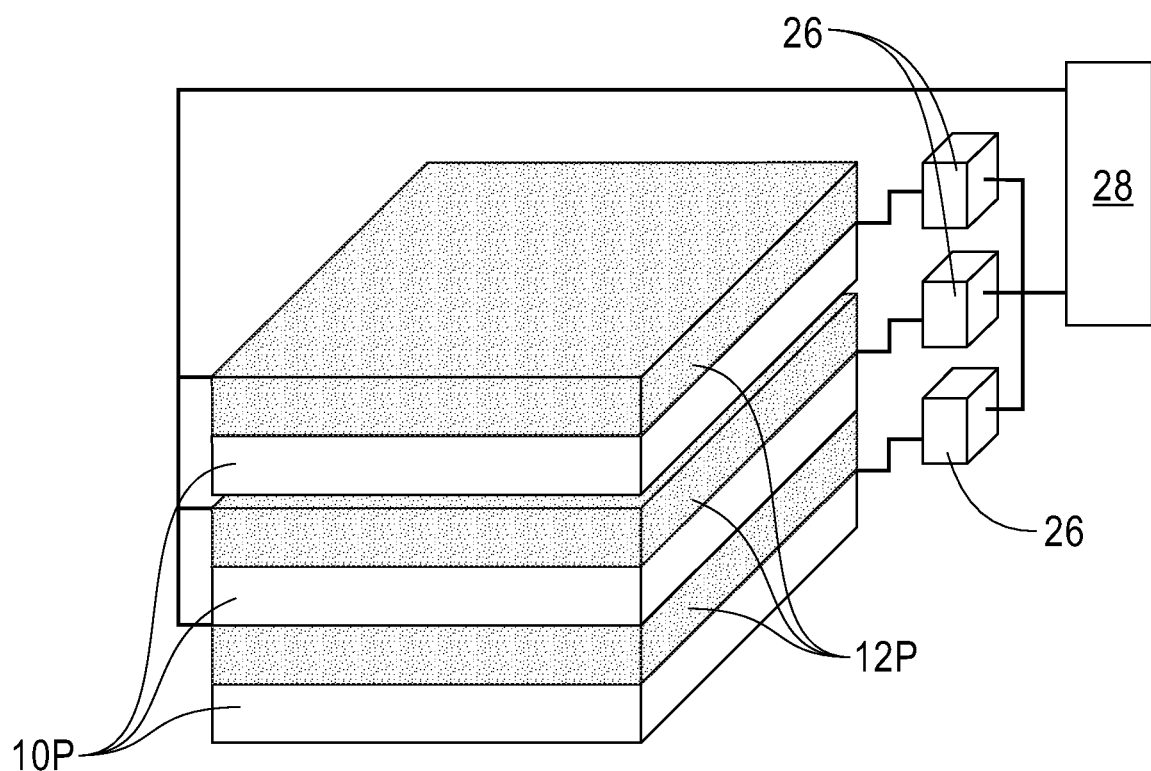
FIG. 4 is a pictorial representation of the stacked battery sub-sheet structure of FIG. 3 after providing a fuse element to each solid-state thin-film battery sub-sheet, and connecting the same to a load.

Referring now to FIG. 4, there is illustrated the vertically stacked solid-state battery structure of FIG. 3 after providing a fuse element 26 to each solid-state thin-film battery sub-sheet (10P, 12P), and connecting the same to a load 28. Each fuse element 26 is in proximity to one of the solid-state thin-film battery sub-sheets (10P, 12P). Collectively, the fuse elements 26 are configured to be in parallel with one another. That is, the fuse elements 26 are arranged so as to provide a same voltage potential to each solid-state thin-film battery sub-sheet (10P, 12P).

The fuse elements 26 may include a metal or metal alloy that melts when the device is shunted and current is overflowed. In one example, the fuse elements 26 include indium, tin, gallium, or alloys thereof. The fuse elements 26 may be formed utilizing conventional techniques including deposition that are well known to those skilled in the art. Each fuse element 26 can be provided to the vertically stacked solid-state thin-film battery structure of FIG. 3 by depositing and etching a metal or metal alloy that provides the fuse elements 26. The fuse elements 26 are typically formed prior to the stacking process.

In some embodiments (not shown in this embodiment), each fuse element 26 can be located in a dielectric material (not shown). In some embodiments, the dielectric material that encases each fuse element 26 may be a porous dielectric material such as, for example, porous carbon. In some embodiments (also not shown), the vertically stacked solid-state thin-film battery structure can be located within an air and/or moisture impermeable structure. The air and/or moisture impermeable structure includes any air and/or moisture impermeable material or multilayered stack of such materials. Examples of air and/or moisture impermeable materials that can be employed in the present application include, but are not limited to, parylene, a fluoropolymer, silicon nitride, and/or silicon dioxide. The air and/or moisture impermeable structure may be formed depositing the air and/or moisture impermeable material.

The load 28 that can be used in the present application includes a source (i.e., charging element) that can provide a voltage to the exemplary structure shown in FIG. 4. The voltage that can be used in exemplary structure shown in FIG. 4 may vary. In one example, the voltage can be from 2 volts to 5 volts. The load 28 may be used to charge/recharge the exemplary vertical stacked solid-state battery structure shown in FIG. 4.

Notably, FIG. 4 shows a solid-state battery structure in accordance with the present application. In this embodiment, the solid-state battery structure includes a plurality of solid-state thin-film battery sub-sheets (10P, 12P) vertically stacked one atop the other. A plurality of fuse elements 26 is located in proximity to the plurality of solid-state thin-film battery sub-sheets (10P, 12P). Each solid-state thin-film battery sub-sheet (10P, 12P) of the plurality of solid-state thin-film battery sub-sheets is connected to one fuse element 26, and the fuse elements 26 of the plurality of fuse elements are configured to be in parallel with one another. A load 28 is present which has a first connection to the parallel arrangement of fuse elements 26, and a second connection to the various solid-state thin-film battery structures portions 12P.

Figure 5A:
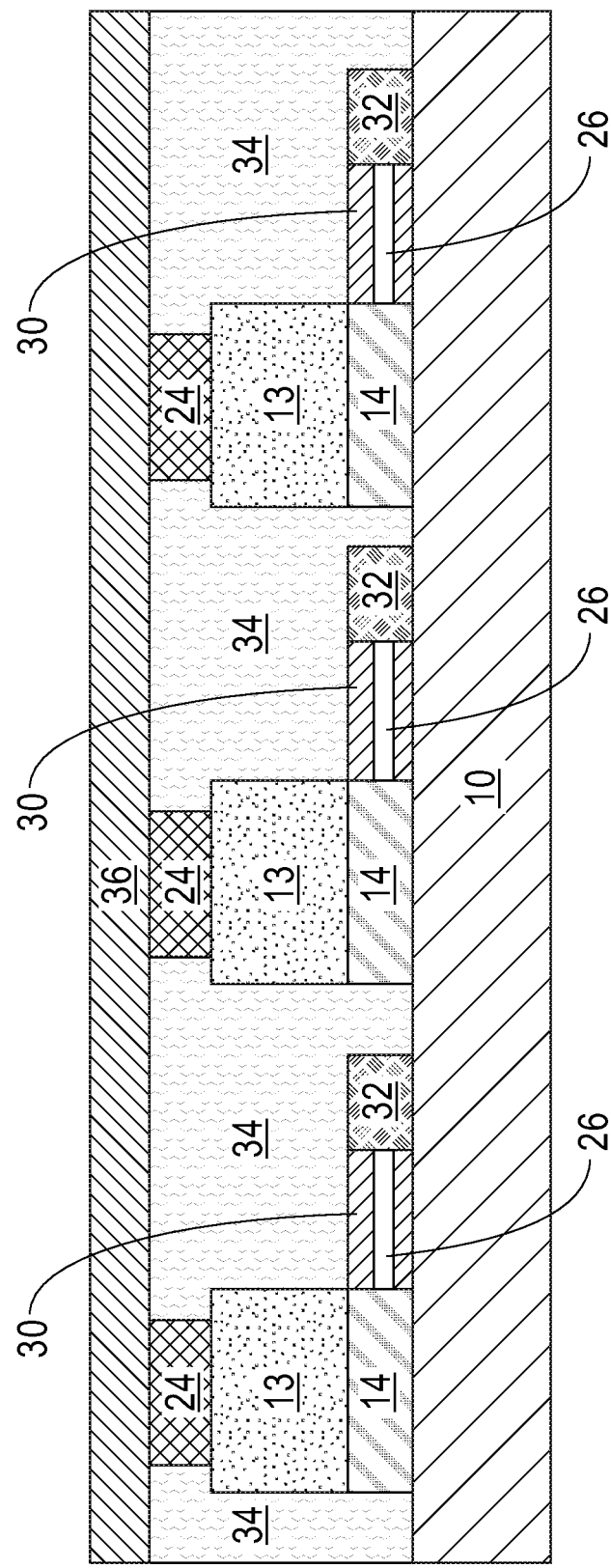
FIG. 5A is a cross sectional view of an array layout containing a plurality of solid-state thin-film batteries in accordance with an embodiment of the present application.

Referring now to FIG. 5A, there is illustrated an array layout for a solid-state battery structure of the present application which contains a plurality of solid-state thin-film batteries. In this embodiment, the solid-state battery structure includes an array of solid-state thin-film batteries located on a surface of a substrate 10, each solid-state thin-film battery of the array of solid-state thin-film batteries comprises a bottom electrode 14 (as defined above), a battery cell material stack 13 (as defined above), and a top electrode 24 (as defined above). The battery cell material stack 13 includes the cathode layer 16, the solid-state electrolyte layer 18, the optional liner 20, and the anode region 22 as defined above. In some embodiments (and as shown in FIG. 5A), the top electrode 24 may have sidewall surfaces that are non-vertically aligned with the sidewall surfaces of the underlying battery cell material stack 13. In other embodiments, the top electrode 24 may have sidewall surfaces that are vertically aligned with the sidewall surfaces of the underlying battery cell material stack 13.

In one embodiment, each solid-state thin-film battery structure of the array shown in FIG. 5A may be formed utilizing a lift-off process such as disclosed in co-pending and co-assigned U.S. patent application Ser. No. 15/474, 570, filed Mar. 30, 2017, the entire content of which is incorporated herein by reference. In another embodiment, each solid-state thin-film battery structure can be formed utilizing a non-lift off process. In such an embodiment, each solid-state thin-film battery structure can be formed by deposition of the various battery layers and thereafter subjecting the same to a patterning step such as, for example, lithography and etching.

The exemplary solid-state battery structure shown in FIG. 5A also includes a plurality of fuse elements 26 (as defined above). Each fuse element 26 of the plurality of fuse elements has a first end connected to the bottom electrode 14 of one of the solid-state thin-film batteries and a second end connected to a first bus bar 32. Each fuse element 26 may be formed as described above and may be encased in dielectric material 30.

In some embodiments, the dielectric material 30 that encases each fuse element 26 may be a porous dielectric material such as, for example, porous carbon. The dielectric material 30 may be formed utilizing deposition and etching.

Figure 5B:
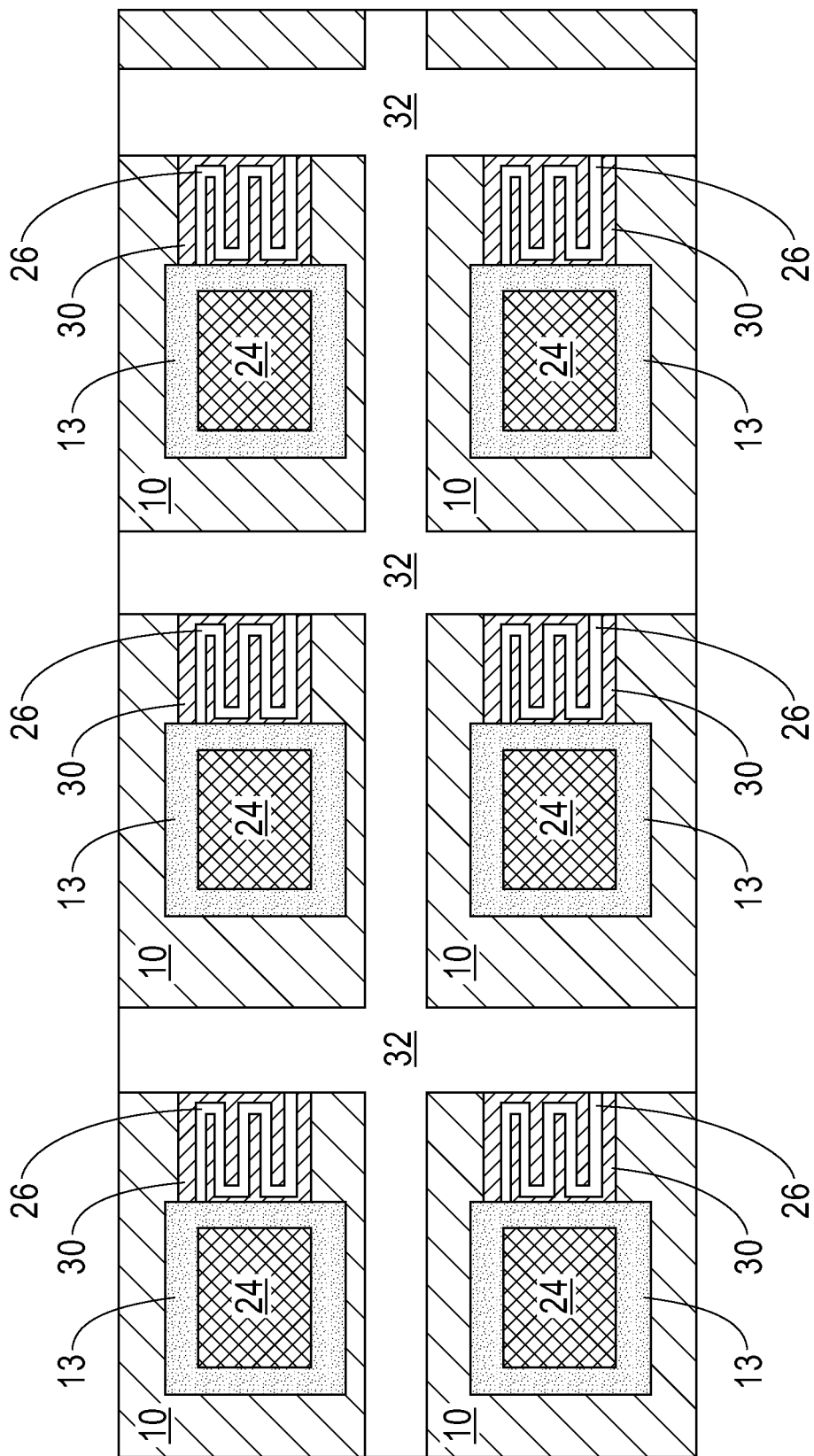
FIG. 5B is a top down view of the array layout shown in FIG. 5A prior to forming a dielectric structure and at least one second bus bar.

The solid-state battery structure of FIG. 5A also includes first bus bars 32 located on the surface of substrate 10, and at least one second bus bar 36 is located above, and spaced apart from, each first bus bar 32, wherein the at least one second bus bar 36 contacts a surface of the top electrode 24 of each solid-state thin-film battery. In some embodiments, a single second bus bar 36 is employed and is present on the entirety of the structure. In other embodiments, a plurality of spaced apart second bus bars 36 is employed. Each first bus bar 32 and each second bus bar 36 includes a contact metal or metal alloy. Illustrative examples of contact metals or metal alloys that may be employed for the first and second bus bars (32, 36) include, tungsten, copper, aluminum, or copper-aluminum alloys. The first bus bars 32 may be formed by deposition and etching, the at least one second bus bar 36 may be formed by deposition. A patterning process may also be used in providing multiple second bus bars 36. As is shown in the top down view of FIG. 5B the fuse elements 26 are configured in parallel to each other.

Prior to forming the at least one second bus bar 36, a dielectric structure 34 is formed surrounding each solid-state thin-film battery, each fuse element 26, each dielectric material 30, and each first bus bar 32. Dielectric structure 34 may include any air and/or moisture impermeable material or multilayered stack of such materials. Examples of air and/or moisture impermeable materials that can be employed in the present application include, but are not limited to, parylene, a fluoropolymer, silicon nitride, and/or silicon dioxide. The dielectric structure 34 may be formed by first depositing the air and/or moisture impermeable material and thereafter a planarization process can be used to provide a topmost surface that is coplanar with a topmost surface of each top electrode 24.

Figure 6:
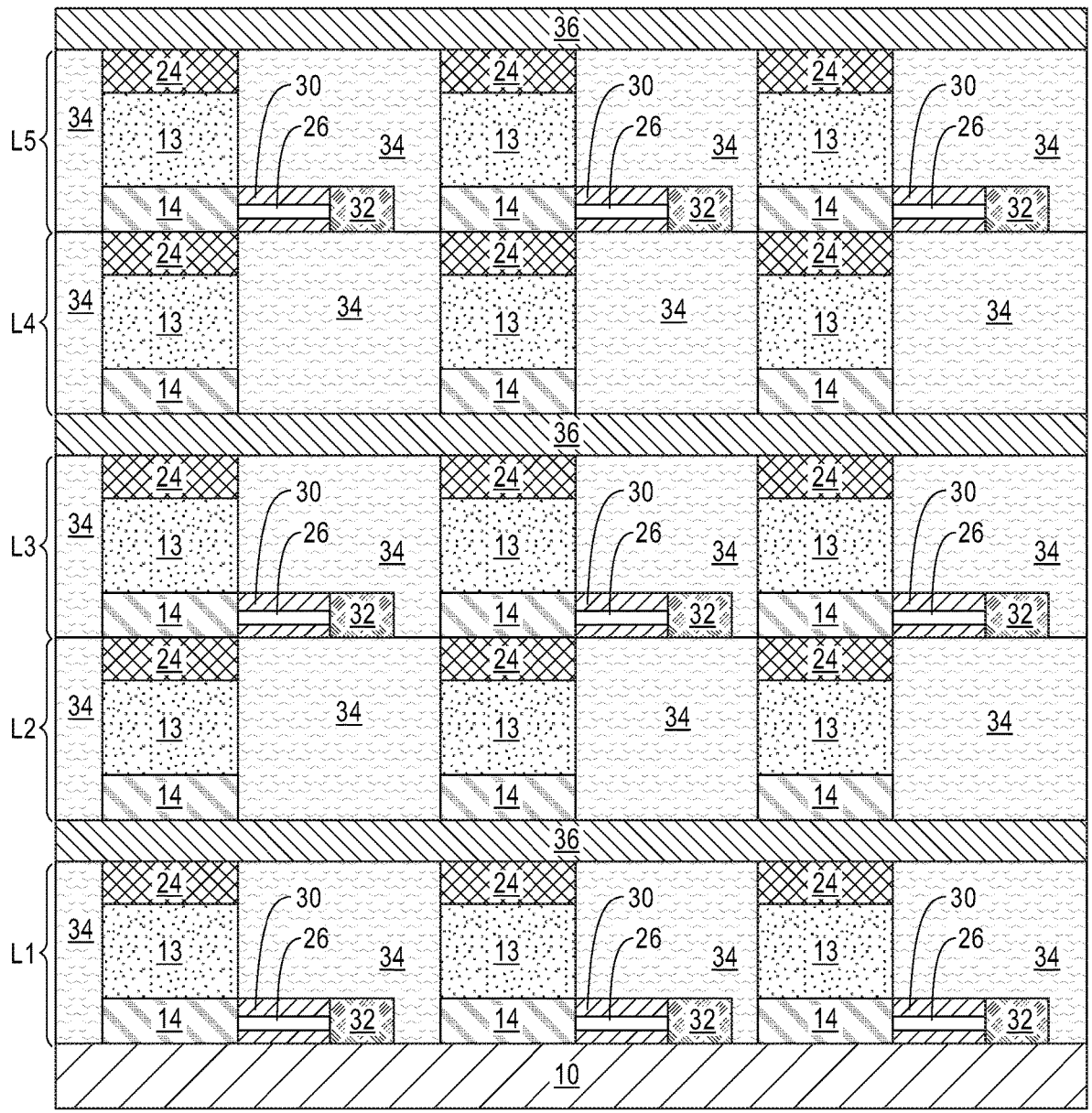
FIG. 6 is a cross sectional view of another array layout including a plurality of battery levels containing arrays of solid-state thin-film batteries stacked one atop the other.

In some embodiments and additional arrays of solid-state thin-film batteries can be stacked one atop the other. Each level can be formed utilizing the materials and technique mentioned above in providing the structure shown in FIG. 5A. In one example and as shown in FIG. 6, a solid-state battery structure is provided that includes a first battery level L1 comprising an array of solid-state thin-film batteries (14, 13, 24) located on a surface of a substrate 10 and a fuse element 26 in proximity to each solid-state thin-film battery of the plurality of solid-state thin-film batteries. The fuse elements 26 are encased in dielectric material 30 as defined above. Each fuse element 26 in the first battery level L1 has a first end connected to a bottom electrode 14 of one of the solid-state thin-film batteries in the first battery level L1 and a second end connected to a first bus bar 32 in the first battery level L1. The first bus bars 32 in the first battery level are located on the substrate 10. A dielectric structure 34 as defined above is also present in the first battery level L1. At least one second bus bar 36 is located above, and spaced apart from, each first bus bar 32 in the first battery level L1, wherein the at least one second bus bar 36 contacts a surface of a top electrode 24 of each solid-state thin-film battery in the first battery level L1. A second battery level L2 comprising an array of solid-state thin-film batteries (14, 13, 24) is located above the at least one second bus bar 36 that is present atop the first battery level. The second level L2 does not include any dielectric material 30 and fuse elements 32. In the present application, the top electrode 24 of the solid-state thin-film batteries in the first battery level L1 are the same type (i.e., anode-side electrode or cathode side-electrode) as the bottom electrode 14 of the solid-state thin-film batteries in the second battery level L2.

In some embodiments, a third battery level L3 is formed atop the second battery level L2. In such an embodiment, the third battery level L3 comprises an array of solid-state thin-film (14, 13, 24) batteries and a fuse element 26 in proximity to each solid-state thin-film battery of the plurality of solid-state thin-film batteries in the third battery level L3. Each fuse element 26 in the third battery level has a first end connected to a bottom electrode 14 of one of the solid-state thin-film batteries in the third battery level L3 and a second end connected to a first bus bar 32 in the third battery level L3. The fuse elements 26 in the third battery level are encased in dielectric material 30, and the third level also includes dielectric structure 34. At least one second bus bar 36 is located on the third battery level L3. In accordance with the present application, each bottom electrode 14 of the plurality of solid-state thin-film batteries present in the third battery level L3 is in direct connect with one of the top electrodes 24 within the second battery level L2, and the bottom electrodes 14 of the plurality of solid-state thin-film batteries present in the third battery level L3 are of the same type (i.e., cathode-side or anode-side) as the top electrodes 24 of the plurality of solid-state thin-film batteries present in the second battery level L2. A fourth battery level L4 that is the same as the second battery level L2 can be formed atop the third battery level L3, and a fifth battery level L5 that is the same as the first and third battery levels (L1 and L3) can be formed atop the fourth battery level. A second bus bar 36 can be formed onto the fifth battery level L5. Additional battery levels can be formed atop the structure shown in FIG. 6 implying the same repetition of different battery levels.

Figure 7:
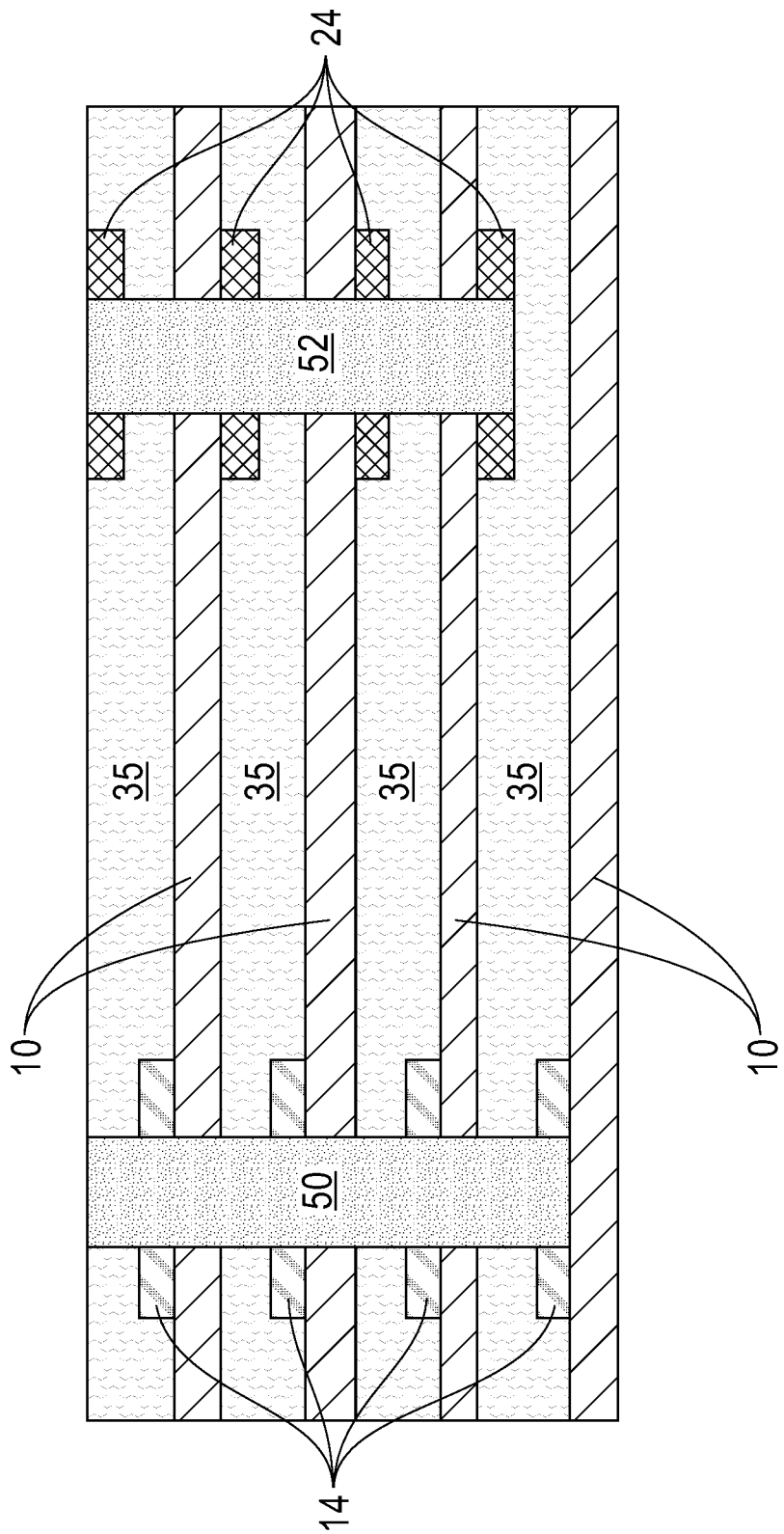
FIG. 7 is a cross sectional view of another solid-state battery structure of the present application.

Referring now to FIG. 7, there is shown a yet other solid-state battery structure in accordance with the present application. In this embodiment, the solid-state battery structure includes a plurality of substrate layers 10 (as defined above) and dielectric material layers 35 stacked one atop the other, wherein each dielectric material layer 35 includes a solid-state thin-film battery located therein, wherein each solid-state thin-film battery comprises at least a bottom electrode 14 (as defined above), a cathode (not shown), a solid-state electrolyte (not shown), and a top electrode 24 (as defined above). A first via-filled contact structure 50 interconnects each bottom electrode together 14, and a second via-filled contact structure 52 interconnects each top electrode 24 together. Each solid-state thin-film battery may include an anode region and an optional liner. For clarity, the cathode, the solid-state electrolyte, optional liner and anode region are not shown in the drawing.

The structure can be formed by first forming a plurality of structures including at least one solid-state thin-film battery (including one of the lithium-based batteries defined above) located on a surface of substrate 10. Dielectric material 35 layers which includes any air and/or moisture impermeable material or multilayered stack of such materials is then formed surrounding the at least one solid-state thin-film battery. Examples of air and/or moisture impermeable materials that can be employed in the present application include, but are not limited to, parylene, a fluoropolymer, silicon nitride, and/or silicon dioxide. The dielectric material layer 35 may be formed by first depositing the air and/or moisture impermeable material and thereafter a planarization process can be used to provide a topmost surface that is coplanar with a topmost surface of each top electrode 24. Each structure is then stacked one atop the other, and then contact openings are formed therein. The contact openings are then filled with a contact metal or metal alloy as defined above and then a planarization process is employed to provide the structure shown in FIG. 7.

Figure 8:
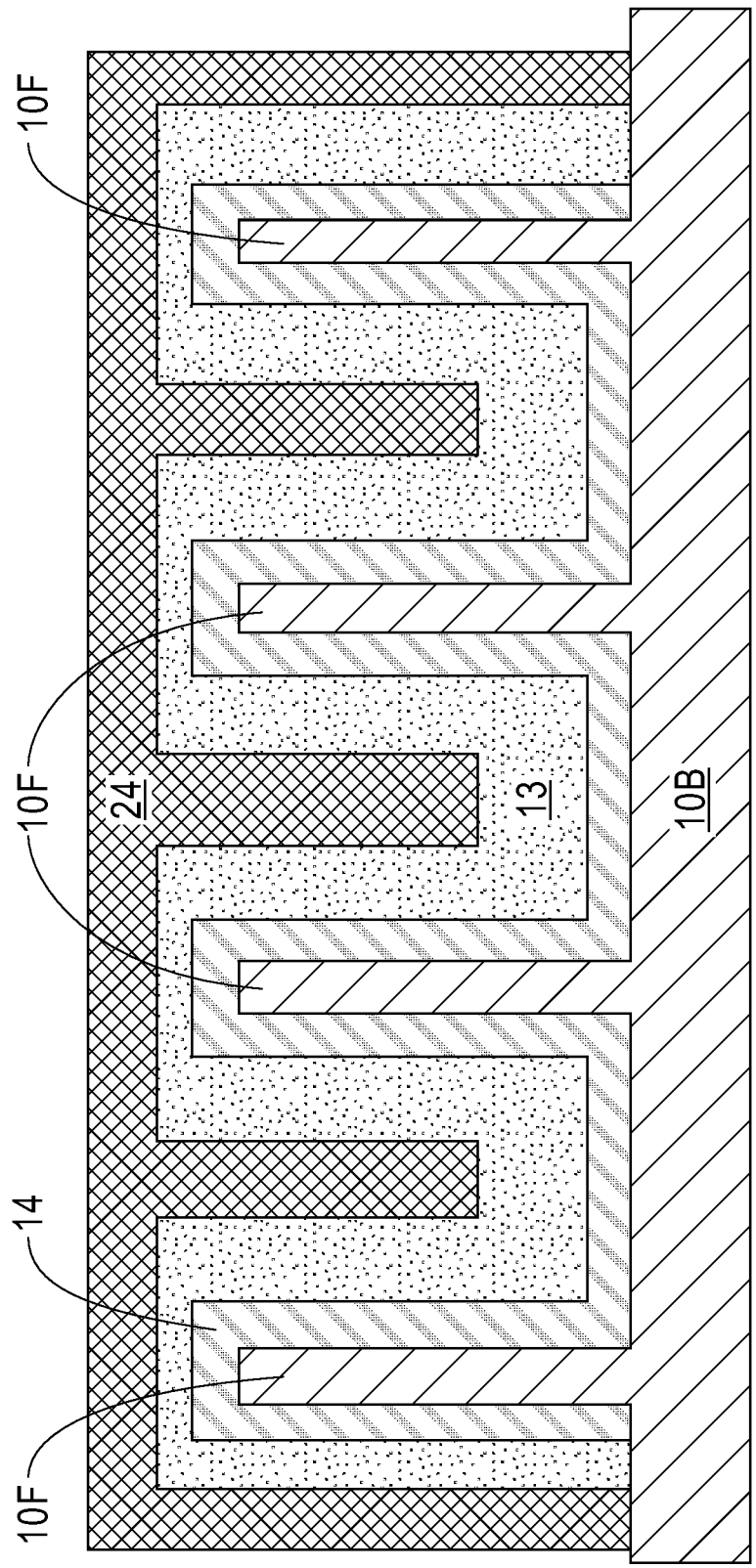
FIG. 8 is a cross sectional view of yet another solid-state battery structure of the present application.

Referring now to FIG. 8, there is illustrated yet further solid-state battery structure of the present application. The exemplary solid-state battery structure of FIG. 8 includes at least one fin structure 10F (three fin structures are shown by way of one example) extending upwards from base substrate 10B. A solid-state thin-film battery structure is located on physically exposed surfaces of the at least one fin structure 10F and on physically exposed surfaces of the base substrate 10B. The solid-state thin-film battery structure includes a bottom electrode 14 (as defined above), a battery cell material stack 13 (as defined above), and a top electrode 24 (as defined above).

The exemplary solid-state battery structure of FIG. 8 can be formed by first providing a substrate (as defined above). The substrate can then be patterned to define the fin structures 10F and the base substrate 10B. In such an embodiment, the fin structures 10F and the base substrate 10B are of unitary construction and comprise a same material. In other embodiments, a base substrate which includes one of the materials mentioned above for substrate 10 is provided. A dielectric structure having openings that expose the base substrate is then provided, and the fin structures are thereafter grown from the physically exposed surface of the base substrate 10 utilizing a conventional epitaxial growth process. The dielectric structure is then removed, and thereafter the various components of the solid-state thin-film battery structure are deposited. Following the deposition of each component, the deposited layer may be lithographically patterned to provide the exemplary solid-state battery structure shown in FIG. 8.

The exemplary solid-state battery structures of the present application (and as shown in FIGS. 4, 5A, 6, 7 and 8) have a fast charge rate C, wherein C is the total charge capacity/hr. By "fast charge rate C" it is meant a charge rate of 3 C or greater. In some embodiments and in which no lithium anode is intentionally deposited in the battery cell material stack, the charging process may include the charging process disclosed in co-pending and co-assigned U.S. patent application Ser. No. 15/474,640, filed on Mar. 30, 2017; the entire content of which is incorporated herein by reference. In such an embodiment, charging includes at least an initial charge stage in which a charge rate of 5 C or greater is performed for a period of time of 50 seconds or less. Further charging at or below the charge rate of 5 C may follow the initial charge stage.

While the present application has been particularly shown and described with respect to preferred embodiments thereof, it will be understood by those skilled in the art that the foregoing and other changes in forms and details may be made without departing from the spirit and scope of the present application. It is therefore intended that the present application not be limited to the exact forms and details described and illustrated, but fall within the scope of the appended claims.

What is claimed is:

1. A solid-state battery structure comprising:
a plurality of fin structures extending upward from a base substrate, wherein each fin structure of the plurality of fin structures and the base substrate are of unitary construction and comprise a same semiconductor material; and
a solid-state thin-film battery structure located on physically exposed surfaces of the plurality of fin structures and on the base substrate, wherein the solid-state thin-film battery structure comprises a bottom electrode, a battery cell material stack, and a top electrode, wherein an end segment of each of the bottom electrode, the battery cell material stack and the top electrode which is adjacent to an outermost fin structure of the plurality of fin structures is in direct physical contact with a topmost surface of the base substrate, the battery material stack that is located between neighboring fin structures of the plurality of fin structures has a bottommost surface that directly contacts a horizontal surface of the bottom electrode that is located between the neighboring fin structures of the plurality of fin structures, and wherein an outermost sidewall of the top electrode that is located adjacent to the outermost fin structure of the plurality of fin structures is physically exposed.

2. The solid-state battery structure of claim 1, wherein the solid-state thin-film battery structure further comprising an anode region located between the solid-state electrolyte and the top electrode.

3. The solid-state battery structure of claim 2, wherein the solid-state thin-film battery structure is a lithium-based battery.

4. The solid-state battery structure of claim 3, wherein the cathode is composed of a lithium-based mixed oxide.

5. The solid-state battery structure of claim 3, wherein the solid-state electrolyte is composed of a material that enables the conduction of lithium ions.

6. The solid-state battery structure of claim 5, wherein the material of the solid-state electrolyte is lithium phosphorus oxynitride (LiPON) or lithium phosphosilicate oxynitride (LiSiPON).

7. The solid-state battery of claim 3, further comprising a lithium nucleation enhancement liner located between the solid-state electrolyte and the anode region.

8. The solid-state battery of claim 7, wherein the lithium nucleation enhancement liner is composed of gold (Au), silver (Ag), zinc (Zn), magnesium (Mg), tantalum (Ta), tungsten (W), molybdenum (Mo), a titanium-zirconium-molybdenum alloy (TZM), or silicon (Si).

9. The solid-state battery structure of claim 2, wherein the anode region is composed of a plurality of lithium regions.

10. The solid-state battery structure of claim 2, wherein the anode region comprises a lithium ion generator or lithium intercalation active material.

11. The solid-state battery structure of claim 1, wherein an entirety of each of the end segments is coplanar with a bottommost surface of each fin structure of the plurality of fin structures.

12. The solid-state battery structure of claim 1, wherein an entirety of each fin structure of the plurality of fin structures is located above the topmost surface of the base substrate.

13. A solid-state battery structure comprising:
a plurality of fin structures extending upward from a base substrate; and
a solid-state thin-film battery structure located on physically exposed surfaces of the plurality of fin structures and on the base substrate, wherein the solid-state thin-film battery structure comprises a bottom electrode, a battery cell material stack, and a top electrode, and wherein an end segment of each of the bottom electrode, the battery cell material stack and the top electrode which is adjacent to an outermost fin structure of the plurality of fin structures is in direct physical contact with a topmost surface of the base substrate and wherein the entirety of each of the end segments is coplanar with a bottommost surface of the at least one fin structure, and wherein the battery material stack that is located between neighboring fin structures of the plurality of fin structures has a bottommost surface that directly contacts a horizontal surface of the bottom electrode that is located between the neighboring fin structures of the plurality of fin structures.

* * * * *